UNITED STATES PATENT OFFICE.

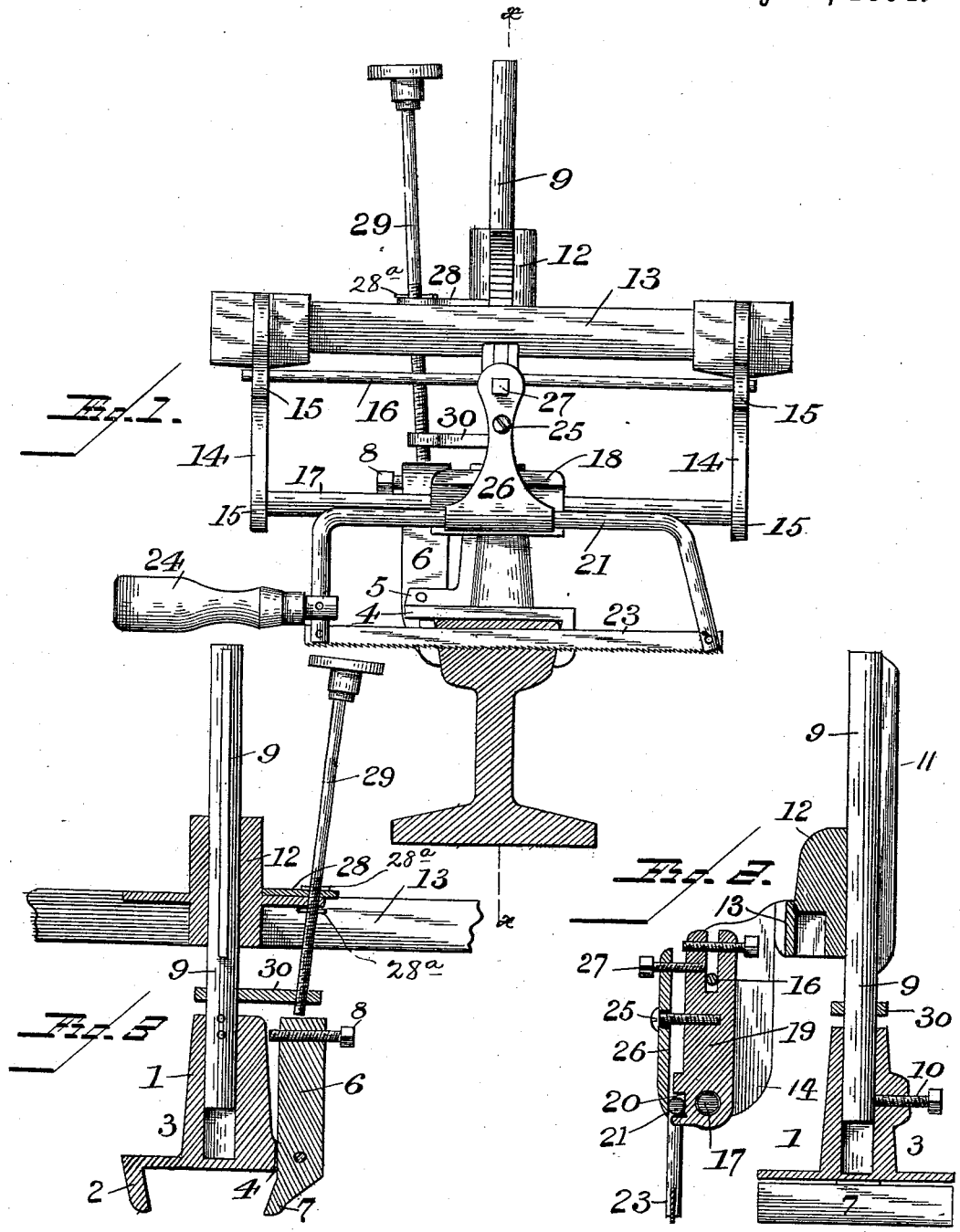

JOSEPH WARREN CALEF, OF NORTH EASTON, ASSIGNOR OF ONE-HALF TO EMERSON W. LAW, OF CAMBRIDGE, MASSACHUSETTS.

DRAG-SAW MACHINE.

SPECIFICATION forming part of Letters Patent No. 523,261, dated July 17, 1894.

Application filed April 30, 1894. Serial No. 509,540. (No model.)

*To all whom it may concern:*

Be it known that I, JOSEPH WARREN CALEF, a citizen of the United States, and a resident of North Easton, in the county of Bristol and State of Massachusetts, have invented certain new and useful Improvements in Drag-Saw Machines; and I do hereby declare that the following is a full, clear, and exact description of the invention, which will enable others skilled in the art to which it appertains to make and use the same, reference being had to the accompanying drawings, which form a part of this specification.

My invention relates to drag saws or hack saws, adapted for sawing metal, such for example as railway rails, structural iron for building purposes, bar iron, and metal in the form of rods or bars so disposed or located that they cannot well be removed for sawing, but must be severed at the place they are, and my improvement consists in the novel construction and combination of parts hereinafter fully described and claimed.

In the accompanying drawings: Figure 1 is a front elevation of a drag saw, constructed in accordance with my invention, showing the same as employed in sawing a railway rail. Fig. 2 is a transverse section of the same, on the line $x$—$x$, Fig. 1. Fig. 3 is a longitudinal section taken centrally through the standard upon which the vertically movable frame is mounted.

In the said drawings, the reference-numeral 1 designates a metal casting formed at one end with a downwardly depending flange 2, forming a fixed clamping-jaw and also formed with an upwardly extending socket 3. This casting at the end opposite said flange is formed with an extension 4 provided with upwardly extending lugs 5, in which is pivoted a vertical lever 6, formed at its lower end with a transverse plate or rib 7, forming a movable clamping jaw. This lever at its upper end is formed with a screw-threaded aperture or hole, in which works a set screw 8, the inner end of which is adapted to abut against the said socket. These two jaws form a clamp and by engaging them with the object to be sawed, as for instance a railway rail, and rotating the set screw, the said jaws firmly clamp the rail and hold the casting tightly in position. Located in the bore in said socket, is a vertical rod or shaft 9, which may be adjusted up and down therein, being held in any position to which it may be adjusted by a set screw 10. This shaft is formed with a rib 11, which works in a slot in a socket 12. Carried by this rod or shaft is the saw frame constructed as follows:

The numeral 12 designates a socket having a central bore through which said rod loosely passes, which socket is formed integral with a horizontal bar or plate 13 formed at each end with downwardly depending arms 14, formed with lugs 15, 15. Connected with the upper lugs is a brace or stay-rod 16 and secured to the lower lugs is a shaft 17 upon which is mounted a horizontally movable carriage 18 formed with an upwardly extending arm 19 having its upper end slotted for the passage of the brace-rod 16. The front face of the carriage 18 is formed with a groove 20 to receive the frame 21 of what is known as a smith's saw, the numeral 23 designating the blade thereof, and 24 the handle. Connected with the arm 19 by a screw 25 passing loosely therethrough, about midway of its height, is a clamping plate 26 the lower end of which is adapted to bear against the saw frame and hold the saw firmly between it and the carriage. At the upper end the plate 26 is provided with a set screw 27 the inner end of which bears against the arm 19. By moving this screw in or out the plate 26 is made to clamp or release the saw.

Formed with or secured to the horizontal plate or bar 13 is a laterally extending arm 28, having an aperture through which passes a screw-rod 29 the lower end of which engages with a screw threaded aperture in a similar arm 30 secured to the vertical rod or shaft 9, by rotating which the saw-frame can be moved up or down. Pins 28$^a$ on rod 29 embrace arm 28 to hold said rod in place.

The operation is as follows: When an object is to be sawed, say for instance a railroad rail, the casting is clamped thereto and the shaft 9 adjusted so that the saw will rest upon the point at which the rail is to be cut, and the set-screw 10 tightened so as to hold the shaft in its adjusted position. By now drawing the saw back and forth the object will be readily cut or severed, the saw being fed downwardly during its operation by rotating the screw-rod 29. By loosening the set screw 10, of socket 3, the shaft 9 may be rotated in the socket, so that the saw may be adjusted to cut at any angle desired.

Having thus fully described my invention, what I claim is—

1. The combination with the casting provided with movable and stationary clamping jaws and with an upwardly extending socket, of the vertical shaft, the vertically adjustable saw frame carried thereby, the horizontal shaft secured to said saw frame, the horizontally movable carriage and the clamp connected therewith, substantially as described.

2. The combination with the casting provided with movable and stationary clamping jaws and with an upwardly extending socket, of the vertically adjustable shaft, having a laterally extending arm, the socket through which said shaft loosely passes, the horizontal bar connected with said socket, the lateral arm secured to said bar, the vertical feed rod engaging with a screw-threaded aperture in the arm carried by the vertical shaft, the downwardly extending arms connected with said bar, the horizontal shaft, the carriage mounted thereon having an upwardly extending arm and a groove on its outer face and the clamping plate connected with said arm, substantially as described.

3. In a drag saw of the character described, the combination with the vertically movable and rotatable frame of the horizontally movable saw carriage having a groove on its outer face and an upwardly extending frame, the clamping plate loosely pivoted to said arm, and the set screw at the upper end thereof, substantially as described.

In testimony that I claim the foregoing as my own I have hereunto affixed my signature in presence of two witnesses.

JOSEPH WARREN CALEF.

Witnesses:
FRANK W. THAYER,
EDITH L. LANE.